(No Model.)
G. M. PILCHER.
BRACE.
No. 503,437. Patented Aug. 15, 1893.
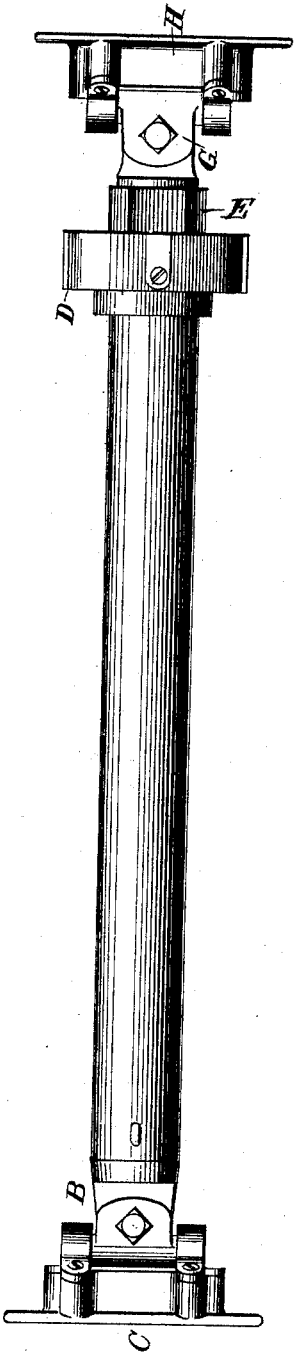
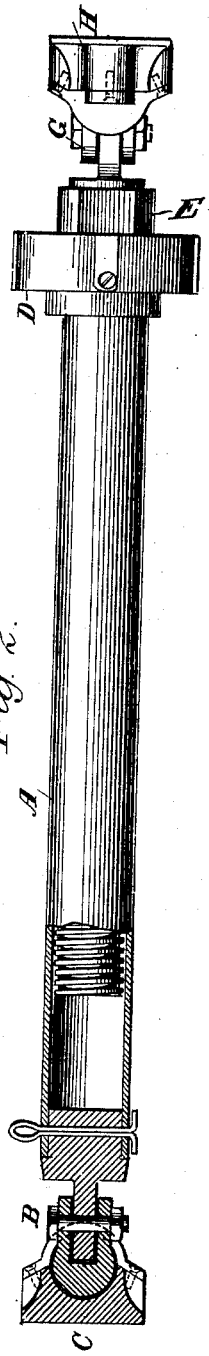
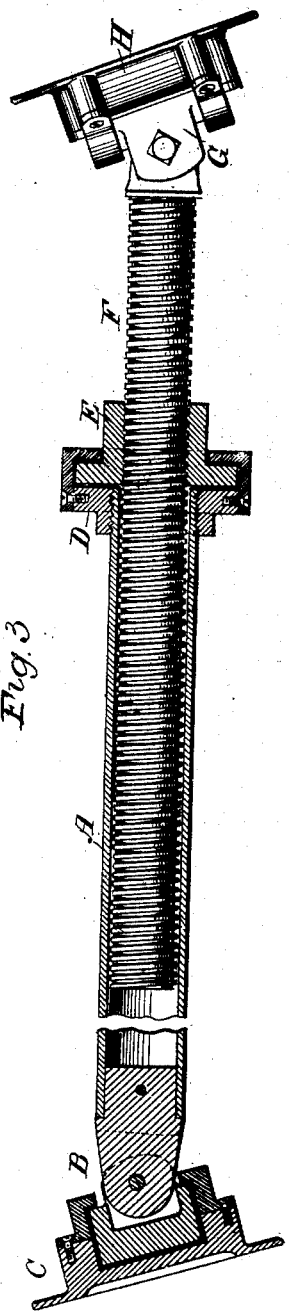
WITNESSES:
Paul Johst
C. Sedgwick
INVENTOR
G. M. Pilcher
BY Munn & Co.
ATTORNEYS.

UNITED STATES PATENT OFFICE.

GEORGE MONROE PILCHER, OF LOGANSPORT, INDIANA.

BRACE.

SPECIFICATION forming part of Letters Patent No. 503,437, dated August 15, 1893.

Application filed January 16, 1893. Serial No. 458,507. (No model.)

*To all whom it may concern:*

Be it known that I, GEORGE MONROE PILCHER, of Logansport, in the county of Cass and State of Indiana, have invented a new and Improved Brace, of which the following is a full, clear, and exact description.

The object of the invention is to provide a new and improved brace, more especially designed for use in trenches and other excavations to effectively brace the banks thereof, the brace being very simple and durable in construction, easily applied and adjusted and not liable to have any of its parts become accidentally detached when applying and adjusting the brace.

The invention consists of certain parts and details, and combinations of the same, as will be hereinafter described and then pointed out in the claim.

Reference is to be had to the accompanying drawings, forming a part of this specification, in which similar letters of reference indicate corresponding parts in all the figures.

Figure 1 is a side elevation of the improvement. Fig. 2 is a plan view of the same with parts in section; and Fig. 3 is a sectional side elevation (the casing being broken away) of the improvement in an extended position and with the blocks in angular position.

The improved brace is provided with a casing A preferably made in the shape of a tube, as illustrated in the drawings, one closed end of the said tube being connected by a universal joint B with a bearing block C adapted to engage one of the banks in the trench or other excavation.

On the open end of the casing A is secured a head D having an annular flanged removable outer section (see Fig. 3) in which is mounted to turn a nut E in which screws a screw rod F connected by a universal joint G with the other bearing block H similar in construction to the bearing block C.

It will be seen that the several parts constituting the brace are connected with each other, and are hence not liable to become detached accidentally when placing the brace into position in the trench or moving it about from place to place.

In using the brace, the latter is put in the usual position in the trench and is extended by turning the nut E so as to screw out the screw rod F, the desired distance to bring the two bearing blocks C and H in contact with the parts to be braced; usually the two opposite banks of the trench. It will be seen that by turning the nut E with a suitable wrench or other tool, the rod F can be screwed out so that the two blocks C and H firmly press against the parts to be braced to securely hold the brace in position, thus preventing the banks of the trench from caving in. As each of the bearing blocks C and H is held on a universal joint, they can assume any desired position, according to the shape of the banks or other parts with which they come in contact when the brace is applied. It will further be seen that the nut E with the screw rod F closes the open end of the casing A, so that no dirt is liable to get inside of the casing and block up the screw rod F, as is so frequently the case in braces now constructed. It is further understood that as the screw rod is always held in place on the pipe, it is impossible for dirt or mud to collect between the threads of the screw.

Having thus fully described my invention, I claim as new and desire to secure by Letters Patent—

A brace consisting in the open ended tube A, a plug closing the outer end of said tube, a bearing block C connected with said plug by a universal joint the pivots or axes of which are at right angles to each other, the head D screwed upon the inner end of the tube and having a removable outer annular section provided with an inwardly extending flange, the nut E having an annular flange held within the annular space formed within the head D, the screw rod F, extending through said nut into the tube and having a bearing block H connected with the outer end by two pivots or axes at right angles to each other, substantially as set forth.

GEORGE MONROE PILCHER.

Witnesses:
JOHN WILLIAM MARKLEY,
CHAUNCEY B. RIDDICK.